United States Patent
Nowak et al.

(10) Patent No.: US 11,878,315 B2
(45) Date of Patent: *Jan. 23, 2024

(54) CLOSEABLE NOZZLE

(71) Applicant: Glatt Gesellschaft mit beschränkter Haftung, Binzen (DE)

(72) Inventors: Reinhard Nowak, Loerrach (DE); Lars Steinke, Loerrach (DE)

(73) Assignee: Glatt Gesellschaft mit beschränkter Haftung, Binzen (DE)

( * ) Notice: Subject to any disclaimer, the term of this patent is extended or adjusted under 35 U.S.C. 154(b) by 129 days.

This patent is subject to a terminal disclaimer.

(21) Appl. No.: 17/604,092

(22) PCT Filed: Mar. 11, 2020

(86) PCT No.: PCT/EP2020/056504
§ 371 (c)(1),
(2) Date: Oct. 15, 2021

(87) PCT Pub. No.: WO2020/212023
PCT Pub. Date: Oct. 22, 2020

(65) Prior Publication Data
US 2022/0203387 A1 Jun. 30, 2022

(30) Foreign Application Priority Data
Apr. 18, 2019 (DE) ............. 10 2019 205 740.3

(51) Int. Cl.
| | | |
|---|---|---|
| B05B 1/32 | (2006.01) | |
| B01J 2/00 | (2006.01) | |
| B05B 3/16 | (2006.01) | |
| B05B 7/06 | (2006.01) | |
| B05B 7/10 | (2006.01) | |
| B05B 12/08 | (2006.01) | |
| A61J 3/00 | (2006.01) | |

(52) U.S. Cl.
CPC ............. *B05B 1/323* (2013.01); *B01J 2/006* (2013.01); *B05B 3/16* (2013.01); *B05B 7/066* (2013.01); *B05B 7/10* (2013.01); *B05B 12/085* (2013.01); *A61J 3/005* (2013.01)

(58) Field of Classification Search
CPC .......... B05B 1/323; B05B 3/16; B05B 7/066; B05B 7/10; B05B 12/085; B01J 2/006; A61J 3/005
USPC ........ 239/416.4, 416.5, 417, 417.3, DIG. 12, 239/DIG. 19
See application file for complete search history.

(56) References Cited

U.S. PATENT DOCUMENTS

| | | | |
|---|---|---|---|
| 4,022,379 | A | 5/1977 | Ladisch |
| 4,302,481 | A | 11/1981 | Ribnitz et al. |
| 7,252,247 | B2 | 8/2007 | Holm et al. |
| 11,400,326 | B2 | 8/2022 | Zahn et al. |
| 2006/0049281 | A1 | 3/2006 | Jacob et al. |

(Continued)

FOREIGN PATENT DOCUMENTS

| | | |
|---|---|---|
| CN | 107835903 A | 3/2018 |
| DE | 2419148 | 11/1975 |
| DE | 8430364.6 U1 | 3/1986 |

(Continued)

*Primary Examiner* — Christopher S Kim
(74) *Attorney, Agent, or Firm* — The Webb Law Firm

(57) ABSTRACT

Described is a nozzle for spraying substances, in particular dispersions, emulsions or suspensions.

19 Claims, 8 Drawing Sheets

(56) References Cited

U.S. PATENT DOCUMENTS

Figure 1:
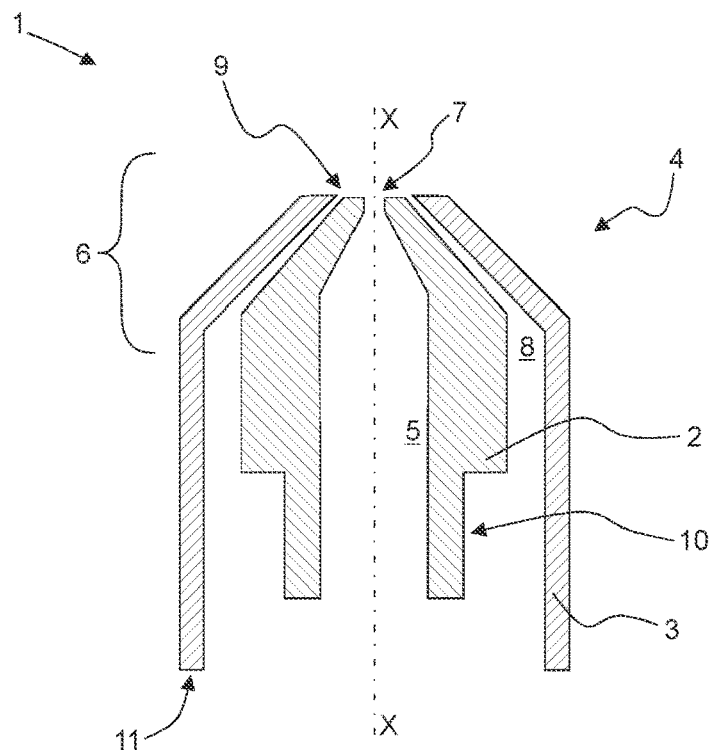

2008/0272209 A1 11/2008 Yokoyama et al.
2022/0202649 A1* 6/2022 Nowak .................. B01J 2/02

FOREIGN PATENT DOCUMENTS

| | | |
|---|---|---|
| DE | 10116051 A1 | 10/2002 |
| DE | 10315386 A1 | 10/2004 |
| EP | 1497034 B1 | 7/2006 |
| FR | 2115663 | 11/1970 |
| FR | 2115663 | 7/1972 |
| FR | 2541911 A1 | 9/1984 |
| JP | S6134866 B2 | 8/1986 |

* cited by examiner

Section B-B

CLOSEABLE NOZZLE

CROSS-REFERENCE TO RELATED APPLICATIONS

This application is the United States national phase of International Application No. PCT/EP2020/056504 filed Mar. 11, 2020, and claims priority to German Patent Application No. 10 2019 205 740.3 filed Apr. 18, 2019, the disclosures of which are hereby incorporated by reference in their entirety.

BACKGROUND

Field

The invention relates to a nozzle for spraying substances, in particular dispersions, emulsions or suspensions, comprising a nozzle body which has a nozzle mouthpiece, wherein the nozzle body comprises an inner pipe, said inner pipe being connected to a feed for the substance to be sprayed and comprising an inner wall and an exit opening, and an outer pipe, said outer pipe being distanced to the inner pipe, being connected to a feed for a gas and comprising an exit opening, and the exit opening of the inner pipe and the exit opening of the outer pipe are arranged in the region of the nozzle mouthpiece.

Description of Related Art

Nozzles or spray nozzles are very often applied in industrial processes, such as for example granulation, the coating of tablets and pellets as well as the direct manufacture of pellets. Hereby, the particles are coated with a layer and/or a film. As a rule, liquids, in which solid matter is dissolved or suspended, are sprayed. These spraying processes can last for several hours. The liquid jet is atomised into small droplets by the atomisation. The droplet size which hereby arises is of huge significance to the manufacturing and/or spraying process. If the droplets are too small, then there is the danger that they dry before they reach their target, and if the droplets are too large, there is the danger of undesirable agglomerates arising. On account of the eddy in front of the nozzle which is inherent of the process—particularly with spraying processes which last for some time—deposits at the nozzle opening, thus a type of dross formation can occur. These deposits influence the symmetry and droplet size of the spray, so that effects upon the process which are not desirable, such as for example spray drying and/or local over-humidification and agglomeration occur. The droplet size can furthermore be influenced by way of particles to be coated or treated settling and remaining in the feed for the substance to be sprayed or in the feed for the gas, in particular the atomisation gas. Such a settling or deposition in particular can occur in those time intervals, in which spraying is not carried out, for example on filling the device, in particular the fluidisation apparatus or the drum coater, by way of the particles getting into the exit openings of the nozzle and blocking these by way of this.

The closest state of the art represents technical solutions which prevent or at least minimise undesired deposits on the nozzle, in particular on the nozzle mouthpiece.

The German Utility model DE 8 430 364 U1 discloses a fluidised bed apparatus with at least one upwardly directed spray nozzle, wherein the spray nozzle(s) has a fluid exit which is closable by a nozzle needle, so that the danger of a blockage of the spray nozzle is avoided, at least however significantly reduced. The disadvantage of the aforementioned technical solution is the fact that the nozzle needle has a very complex construction for the liquid exit of the spray nozzle.

It is therefore the object of the invention to provide an inexpensive nozzle which on account of its low number of individual parts is simple to manufacture and assemble and which remedies the disadvantages of the state of the art.

SUMMARY

Given a nozzle of the aforementioned type, this object is achieved in that the inner pipe is designed at least partly of an elastic material and a device which comprises an inlet for the fluid feed and an outlet for the fluid discharge is arranged in the annular gap between the inner pipe and the outer pipe, wherein the device has a closure position for closing the inner pipe and at least one open position, wherein in the at least one open position the substance to be sprayed can flow at least through the fluid channel, and wherein the device is designed in a manner such that the volume of the device can be changed by the fluid feed or the fluid discharge, by which means the device can be brought or is brought from the one closure position of the inner pipe into the at least one open position of the inner pipe and vice versa.

Advantageously, it is possible to enlarge or decrease in size, i.e., change the size of the device in its volume by way of the fluid feed or fluid discharge, so that at least the fluid channel is closed in the closure position. Preferably, the device is connected to a closed-loop control device which closed-loop controls the fluid feed or fluid discharge of the device, so that the volume of the device can be adjusted or is adjusted. Particularly preferably, the volume of the device is infinitely adjusted or adjustable. The fluid feed or fluid discharge can be closed-loop controlled or controlled, in particular in an infinite manner, by way of the closed-loop control device. This has the advantage that different process parameters, in particular of a type with regard to flow technology, e.g., the flow speed in the fluid channel and/or annular gap or the volume flow of the fluid channel and/or of the annular gap can be adjusted during the manufacturing or treatment process, by which means an adaptation of the spray quality can be effected. By way of an enlargement of the volume by way of the fluid feed to the device, the inner pipe which is designed at least partly of elastic material is pressed together for closing the fluid channel for the feed of the substance to be sprayed. Furthermore, on account of the increase of the volume, the annular gap for the gas, in particular for the atomisation gas is at least partly closed, depending on the volume increase of the annular gap.

Further advantageous embodiments of the preferred nozzle are described in the below embodiments.

According to a further advantageous further development, the device comprises a maximal open position. Very particularly preferably, the volume of the device is minimal in the maximal open position. According to this embodiment, the device has a minimal volume, so that in this position of the device a maximal volume flow of gas as well as of substance to be sprayed flows through the feeds. For this, the device of the nozzle is preferably designed annularly around the inner pipe. The annularly designed device is preferably designed as a pressurised air ring.

Particularly preferably, the nozzle comprises several devices, in particular two devices. Very particularly preferably, the nozzle comprises a device for the closure of the annular gap and a device for the closure of the fluid channel. This provides the possibility of adjusting the volume flow of the gas, in particular of the atomisation gas, and the volume flow of the substance to be sprayed, independently of one another, so that during the manufacturing or spraying process of the particles, an even better adjustment of the spray parameters can be carried out and it can be simultaneously ensured that for example on filling the process facility, in particular a fluidisation apparatus or a drum coater, the exit openings of the nozzle do not become clogged by way of the substance to be treated settling and depositing there. With regard to this preferred embodiment, it is to be noted that at the beginning of each spraying procedure it is firstly the gas, in particular the atomisation gas which must flow out of the nozzle and subsequently the substance to be sprayed, in particular the liquid. On completing the spraying procedure, it is firstly the feed of the substance to be sprayed which is to be stopped and subsequently that of the gas. By way of this, it is always ensured that the substance to be sprayed is atomised at the beginning of each spraying procedure and that no substance to be sprayed drips out of the nozzle without being atomised at the end of each spray procedure.

Advantageously, an inlay is arranged on the inner pipe or on the outer pipe, wherein the inlay is arranged such that it can be or is brought into motion, in particular oscillation or the like, in particular into a high-frequency oscillation, by way of the substance to be sprayed, in particular a liquid, which exits out of the exit opening of the inner pipe, and/or by way of the gas, in particular atomisation air, which flows out of the exit opening of the outer pipe. Preferably, the oscillation has a frequency of 5 Hz to 1500 Hz, particularly preferably between 25 Hz and 500 Hz, very particularly preferably between 25 Hz and 250 Hz. On account of the high-frequency movement of the inlay, vibrations at a certain frequency arise at the inlay, by which means a caking of the material to be atomised, preferably of a liquid, very particularly preferably of a dispersion, at the nozzle mouthpiece is prevented. Thus, the symmetry and the droplet size of the spray are not influenced by a caking-on of the substance to be sprayed, during the manufacture and/or spraying process, so that an undesirable spray drying and/or a local over-humidification and agglomeration do not occur.

According to an embodiment of the nozzle according to the invention, which is advantageous with respect to this, the inlay is arranged on the inner wall or on an outer wall or in a wall of the inner pipe and projects at least partly into an exit region of the substance to be sprayed and/or of the gas. Concerning an additional preferred development of the invention, the inlay is arranged on the inner wall or on an outer wall or in a wall of the outer pipe and projects at least partly into an exit region of the substance to be sprayed and/or of the gas. By way of such an arrangement, the inlay which projects at least partly into an exit region of the substance to be spayed and/or of the gas can be brought into oscillation particularly well, so that a caking-on of the material to be sprayed is significantly reduced or even completely prevented in the region of the nozzle mouth, so that the symmetry and the optimal droplet size of the spray is always ensured during the manufacturing and/or spraying process.

The outer pipe and the inner pipe are preferably arranged coaxially about an axis. Particularly preferably, the outer pipe and the inner pipe are arranged to one another in a manner such that the exit opening of the outer pipe is arranged concentrically to the exit opening of the inner pipe. By way of this, the leading of the flow, in particular the leading of the flow of the gas in the annular gap is significantly improved, so that the spray symmetry and the droplet size can be adjusted in an optimal manner.

Furthermore, the inlay can be arranged or is arranged in an exchangeable manner. By way of the exchange of the inlay, one can directly influence the manufacturing and/or spraying process, for example by way of the inlay being adapted for example to the substance to be atomised. If the substance to be sprayed, in particular a liquid is for example an abrasive material or an acid or alkali, then the inlay material can be simply adapted to the new process conditions. A more rapid or simpler exchange of the inlay is of a great advantage and use also with regard to strict process specifications, particularly in the pharmaceutical industry or foodstuff industry, for example with regard to the product purity and/or foodstuff compatibility.

A part-section of the inlay is preferably changeable in length. On account of the length changeability of the part-section of the inlay which projects at least partly out of the inner pipe or the outer pipe of the nozzle, it is possible to change the movability of the part-section, in particular the frequency of the vibration of the part-section of the inlay and to adapt it for example to changed process conditions during the manufacturing process and/or spraying process. By way of this, one can influence the manufacturing process and/or spraying process in a direct manner by way of the vibration frequency of the inlay being adapted or adaptable to the substance to be sprayed, in particular liquid, for example a highly viscous fluid or a suspension, emulsion or the like. By way of this, one prevents deposits arising at the nozzle mouthpiece. If the nozzles, in particular their nozzle mouthpiece is monitored by sensor devices, such as for example a camera, then it is furthermore possible to change the frequency online during the running process, so that a caking-on can be prevented.

According to an additional advantageous further development, the inlay and the inner pipe are designed as a single-piece conduit. This has the advantage that the inner conduit can be exchanged as a whole given a conversion from a first manufacturing or treatment process to a second manufacturing or treatment process and is therefore ideally suitable for pharmaceutical processes. Furthermore, the inlay is always optimally adapted to the manufacturing or treatment process and the inner pipe does not need to be cleaned given the conversion of the manufacturing or treatment process. An inexpensive but optimally designed component for the nozzle is manufactured by way of the advantageous embodiment.

In an additional embodiment of the nozzle according to the invention, the inlay is manufactured from at least one elastic material, preferably of a polymer. Preferably, the at least one polymer is a synthetic polymer, in particular a silicone. Polymers are comprehensive materials which for example are inexpensively manufacturable, very robust but are also quite temperature-resistant depending on the polymer. The polymers, in particular the synthetic polymers are therefore very well suited as an inlay for the most varied of processes and substances to be sprayed.

An attachment part in the form of swirl bodies, swirl plates or the like for leading the gas is preferably arranged in the region of the nozzle mouthpiece between the outer pipe and the inner pipe. Particularly preferably, the attachment part is arranged for guiding the inner pipe. Very particularly preferably, the attachment part is fixedly connected to the inner pipe and/or to the outer pipe. By way of the installation of an attachment part in the form of swirl bodies, swirl plates the like, the leading of the flow of the gas, in particular of the atomisation air, on the nozzle mouthpiece can be influenced, by which means the movement and oscillation behaviour, in particular the vibration frequency of the part-section of the inlay, of the inlay which projects at least partly out of the inner and outer pipe, is changeable. By way of this, the spray symmetry, and the droplet size of the spray, i.e., of the liquid to be atomised, can be set in a direct manner. Furthermore, the inner pipe is led in the outer pipe on installation and is always held in the desired position. Furthermore, the attachment part prevents an oscillating of the inner pipe, which leads to a change of the dimensions of the exit openings of the inner pipe as well as the outer pipe, which changes the flow conditions of the substance to be sprayed and of the gas at the nozzle mouthpiece and therefore also the spray symmetry and the droplet size.

Preferably, the inlay has a variable wall thickness. The wall thickness of the inlay, in particular of the part-section of the inlay which projects out of the inner pipe, can be adapted to the substance to be sprayed, in particular to a liquid to be sprayed, by which means the spray behaviour, preferably the spray symmetry and the setting of the droplet size, of the nozzle according to the invention can be optimised. The oscillation behaviour is changed by way of changing the wall thickness given the same length of the inlay which projects at least partly out of the inner pipe and/or the outer pipe, by which means the inlay is adaptable or adapted especially to the respective process in view of method technology.

BRIEF DESCRIPTION OF THE DRAWINGS

The invention is hereinafter explained in more detail by way of the accompanying drawings. They are shown in FIG. 1 a nozzle according to the state of the art, FIG. 2 a section B-B according to FIG. 4 through a first embodiment of a preferred nozzle, FIG. 3 a detailed view of a part of the nozzle mouthpiece of the first embodiment of the preferred nozzle according to detail A of FIG. 2, FIG. 4 a plan view upon the first embodiment of a preferred nozzle according to FIG. 2 with a section plane B-B which intersects the axis X-X, FIG. 5 a section through a second embodiment of a preferred nozzle with an attachment part in the annular gap, in the form of a swirl plate for leading gas, FIG. 6 a section through a third embodiment of a preferred nozzle with an attachment part in the form of a swirl plate for leading gas in the annular gap, FIG. 7 a section through a fourth embodiment of a preferred nozzle, FIG. 8 a section through a fifth embodiment of a preferred nozzle, FIG. 9 a section through a sixth embodiment of a preferred nozzle, FIG. 10 a section through a seventh embodiment of a preferred nozzle, FIG. 11 a section through a preferred nozzle according to the first embodiment, wherein the nozzle comprises a nozzle needle which is displaceable in the axial direction, for closing the exit openings of the nozzle, FIG. 12 a section through a preferred nozzle, wherein the inlay and the inner pipe form a single-piece inner conduit of the preferred nozzle, FIG. 13 a section through preferred nozzle, wherein the inlay and the inner pipe form an inner conduit of the preferred nozzle and the preferred nozzle in the region of the nozzle mouthpiece between the inner and outer pipe comprises a device which is changeable in its volume, wherein the device in FIG. 13 shows an open position of the preferred nozzle, FIG. 14 a section through a preferred nozzle, wherein the inlay and the inner pipe form an inner conduit of the preferred nozzle and the preferred nozzle in the region of the nozzle mouthpiece between the inner pipe and the outer pipe comprises a device which is changeable in its volume, wherein the device in FIG. 14 shows a closure position of the preferred nozzle, FIG. 15 a schematic construction of a first method for monitoring the nozzle mouthpiece of a first embodiment of the preferred nozzle, and FIG. 16 a schematic construction of a second method for monitoring the nozzle mouthpiece of a first embodiment of the preferred nozzle.

DETAILED DESCRIPTION

A nozzle 1 which is known from the state of the art is represented in FIG. 1. The nozzle 1 comprises a nozzle body 4 which comprises an inner pipe 2 and an outer pipe 3. The inner pipe 2 and the outer pipe 3 are hereby arranged coaxially to an axis X-X.

The inner pipe 2 comprises a fluid channel 5 which is designed for feeding the substance to be sprayed, preferably a liquid, very particularly preferably a dispersion, suspension, or emulsion. This fluid channel runs out in the region of the nozzle mouthpiece 6 into an exit opening 7 of the inner pipe 2. In the region which is away from the exit opening 7 of the inner pipe 2, the inner pipe 2 comprises a connection location 10 for a feed conduit for the substance to be sprayed, said feed conduit not being represented.

The outer pipe 3 is arranged distanced to the inner pipe 2, by which means an annular gap 8 for feeding the gas, in particular atomisation air forms. The annular gap 8 runs out into an exit opening 9 of the outer pipe 3 in the region of the nozzle mouthpiece 6. In the region which is away from the exit opening 9 of the outer pipe 3, the outer pipe 3 comprises a connection location 11 for a feed conduit for the gas, said feed conduit not represented.

FIG. 2 shows a section B-B according to FIG. 4 through a first embodiment of preferred nozzle 101. The preferred nozzle 101, as already represented in FIG. 1, comprises a nozzle body 104 which has an inner pipe 102 and an outer pipe 103. The inner pipe 102 and the outer pipe 103 are arranged coaxially to an axis X-X.

The inner pipe 102 comprises a fluid channel 105 for feeding the substance to be sprayed, preferably a liquid, very particularly preferably a dispersion, suspension, or emulsion. This runs out into an exit opening 107 of the inner pipe 102 in the region of the nozzle mouthpiece 106. In the region which is away from the exit opening 107 of the inner pipe 102, the inner pipe 102 comprises a connection location 110 for a feed conduit for the substance to be sprayed, said feed conduit not being represented.

The outer pipe 103 is arranged in a manner distanced to the inner pipe 102, by which means an annular gap 108 for feeding the gas, in particular atomisation gas forms. The annular gap 108 runs out into an exit opening 109 of the outer pipe 103 in the region of the nozzle mouthpiece 106. Preferably, the exit opening 107 of the inner pipe 102 and the exit opening 109 of the outer pipe 103 are arranged concentrically to one another. By way of this, it is ensured that the flow conditions of the gas which is delivered in the annular gap 108 are formed in an optimal, in particular uniform manner, so that the symmetry and droplet size of the spray which is produced by way of the preferred nozzle 101 are matched precisely to the demands of the manufacturing and/or spraying process, in particular manufacturing process and/or spraying process for granulates, tablets or the like. A connection location 111 for a feed conduit for the gas, said feed conduit not being shown, is given in the region which is away from the exit opening 109 of the outer pipe 103. Preferably, the exit openings 107, 109 lie in a plane C-C and run out into the exit region 112 of the nozzle 101. In the exit region 112, the spray which coats the particles is produced by the colliding of the substance to be sprayed and the atomisation gas. Advantageously, the symmetry as well as the droplet size of the spray is set in an optimal manner during the manufacturing process and/or spraying process.

Figure 2:
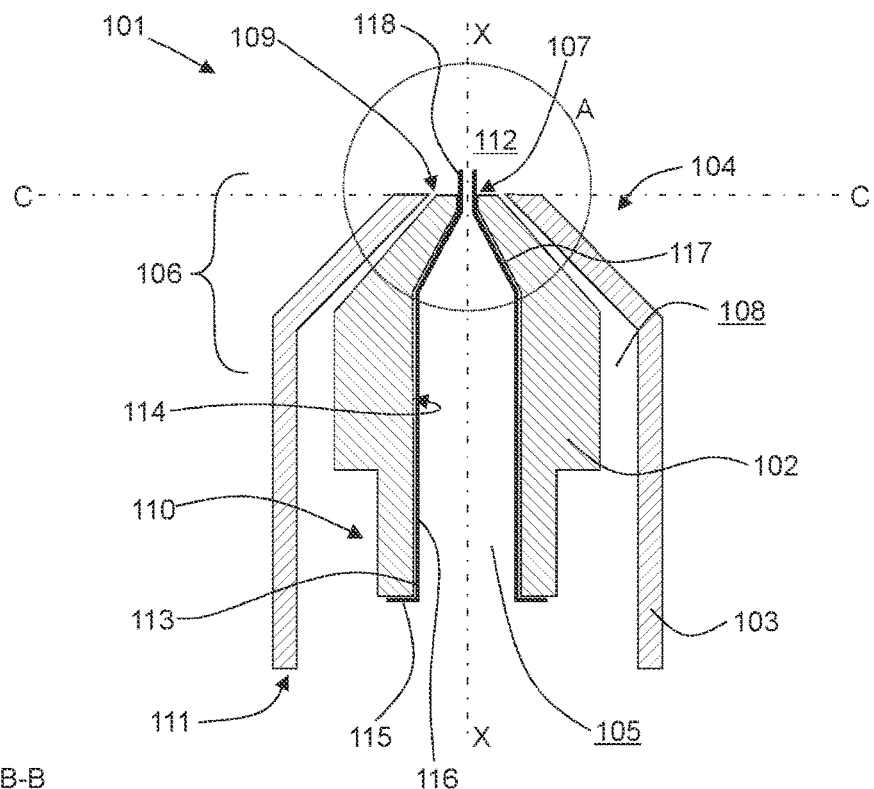

The inner pipe 102 comprises an inlay 113. The inlay 113 in FIG. 2 is arranged in its preferred position on an inner wall 114 of the inner pipe 102. The inlay 113 is preferably manufactured from a polymer, particularly preferably from a synthetic polymer, very particular preferably for a silicone. Polymers are multi-faceted materials which given a simultaneous high robustness are manufacturable in an inexpensive manner and can be very temperature-resistant depending on the polymer. The polymers, in particular the synthetic polymers are therefore very suitable as an inlay 113 for the most varied of different manufacturing processes and/or spray processes. The preferred nozzle 101 can be applied in the most varied of manufacturing processes and/or spray processes on account of the exchangeability of the inlay 113.

The inlay 113 in the first embodiment of the preferred nozzle 101 comprises four part-sections 115 to 118. The part-section 115 secures the inlay 113 in the nozzle 101, so that the inlay 113 is arranged in the preferred nozzle 101 during the complete manufacturing and/or spraying process. Advantageously, the inlay 113 is connected to the inner pipe 102 such that this is fixed there. The part-sections 116 and 117 in the preferred nozzle 101 are arranged between the part-section 115 and the part-section 118 and bear on the inner wall 114 of the inner pipe 102. The part-section 118 of the inlay 113 projects at least partly out of the exit opening 107 of the inner pipe 102. By way of the possibility of the adjustment of the holding point of the part-sections 115 on the inner pie 102, the length of the part-section 118 of the inlay 113 which projects out of the exit opening 107 of the inner pipe 102 can be changed.

Figure 3:
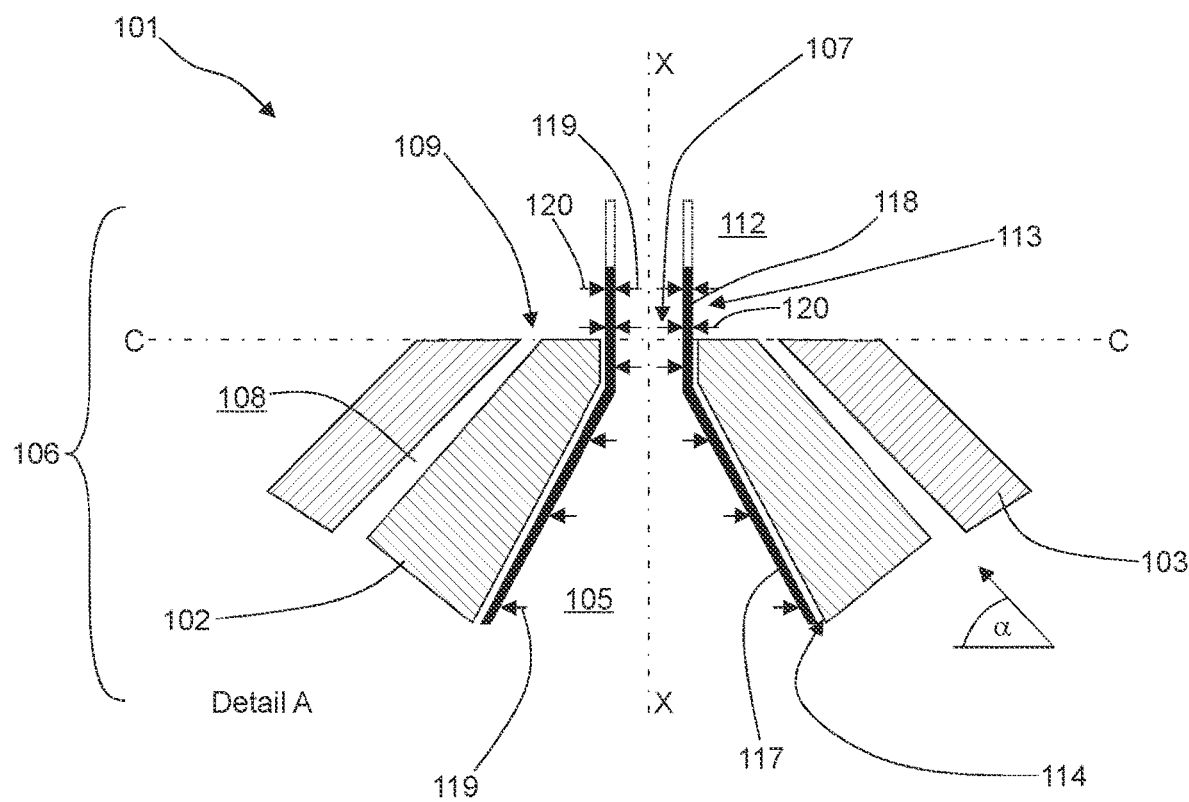

FIG. 3 shows a detailed view of a part of the nozzle mouthpiece 106 of the first embodiment of the preferred nozzle 101 according to detail A of FIG. 2. The inner pipe 102 and the outer pipe 103 are arranged coaxially about the axis X-X, so that the exit openings 107, 109 are arranged concentrically about the intersection point of the axis X-X with the plane C-C. The exit opening 107 of the inner pipe 102 and the exit opening 109 of the outer pipe 103 furthermore lie in the plane C-C and run out into the exit region 112 of the nozzle 101. The spray which coats the particles is produced in the exit region 112 by way of the collision of the substance to be sprayed and the atomisation gas. Advantageously, the symmetry as well as the droplet size of the spray is adjusted during the manufacturing and/or spraying process.

The part-section 117 of the inlay 113 bears on the inner wall 114 of the inner pipe 102 of the preferred nozzle 101 and is connected to the part-section 118 of the inlay 113. The part-section 118 of the inlay 113 projects at least partly out of the exit opening 107 of the inner pipe 102 of the preferred nozzle. 101. The part-section 118 of the inlay 113 is preferably changeable in length. The length changeability is represented by the dotted line which is adjacent to the part-section 118. The length change can either be effected in a direct manner by way of exchanging the inlay 113, by way of adjusting the holding point of the inlay 113 on the inner pipe 102 and/or any other change of the arrangement of the inlay 113 in the nozzle 101.

An inner pressure 119 acts upon the inlay 113 by way of the substance to be sprayed, preferably a liquid, particularly preferably a dispersion, suspension, or emulsion, which is conveyed in the fluid channel 105 in the direction of the exit opening 107 through the inner pipe 102 which comprises an inlay 113. The inlay 113 is pressed against the inner wall 114 of the inner pipe 102 by way of the inner pressure 119 which acts upon the inlay 113. In the region of the nozzle mouthpiece 106, in particular in the region of the exit opening 107 of the inner pipe 102, a force which moves the inlay 113 away from the axis X-X likewise acts upon the part-section 118 of the inlay 113 by way of the inner pressure 119 which acts upon the inlay 113.

Furthermore, a force 120 which acts in the direction of the axis X-X acts upon the part-section 118 of the inlay 113 which projects at least partly out of the exit opening 107 of the inner pipe 102. The force 120 which acts in the direction of the axis X-X is created by the gas, in particular atomisation air, which exits from the exit opening 109 out of the annular gap 108.

By way of this, the inlay 113 which projects at least partly out of the exit opening 107 of the inner pipe 102 is moved, advantageously in a high-frequency manner, by the liquid which exits out of the preferred nozzle 101 into the exit region 112 of the nozzle 101 and/or by the gas, in particular atomisation gas which exits out of the preferred nozzle 101 into the exit region 112 of the nozzle 101. Due to this advantageously high-frequency movement of the inlay 113 which projects at least partly out of the exit opening 107 of the inner pipe 102, deposits of the liquid to be atomised, on the nozzle mouthpiece 106, in particular in the exit region 112, or their agglomeration, is prevented. The symmetry and droplet size of the spray is therefore not influenced during the manufacturing and/or spraying process, so that an undesirable spray drying and/or a local over-humidification and agglomeration does not occur.

Figure 4:
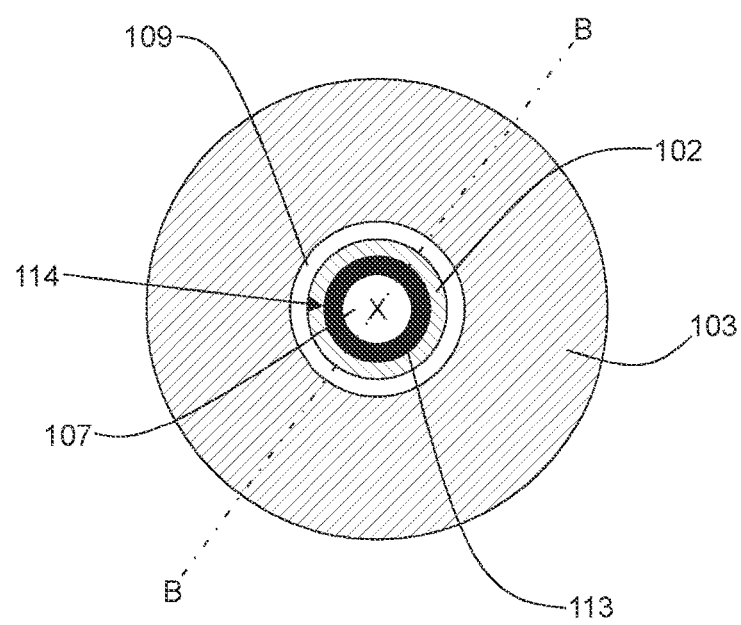

The vibration frequency of the part section 118 of the inlay 113 can be additionally changed for example by way of the length changeability of the part-section 118 of the inlay 113. By way of this, one can have a direct influence upon the manufacturing and spraying process. A further change of the vibration frequency is possible for example by way of adapting the pressures of the substance or gas which is to be sprayed. A change of the onflow angle $\alpha$ of the gas, in particular of the atomisation air also effects a change of the vibration frequency of the inlay 113 and therefore has an influence upon the spray and its quality, in particular with regard to the symmetry and the particle size. The arrangement of the outer pipe 103 and the inner pipe 102 to one another is to be adapted, in particular in the region of the nozzle mouthpiece 106, for changing the onflow angle $\alpha$ of the gas. Furthermore, the onflow of the inlay 113 can also be adapted by way of a changed flow guidance in the annular gap 108. Very preferably, it is only the annular gap 108 which is adapted, so that this has a different onflow angle with respect to the part-section 118 of the inlay 113. FIG. 4 shows a plan view upon the first embodiment of a preferred nozzle 101 with a section plane B-B which intersects the axis X-X. The inner pipe 102 and the outer pipe 103 are aligned coaxially to the axis X-X, so that the exit openings 107, 109 for the substance to be sprayed, in particular a liquid, very particularly preferably a dispersion, or for the gas, in particular atomisation air, are arranged concentrically to one another about the axis X-X. The inlay 113 is arranged on the inner wall 114 of the inner pipe 102.

Figure 5:
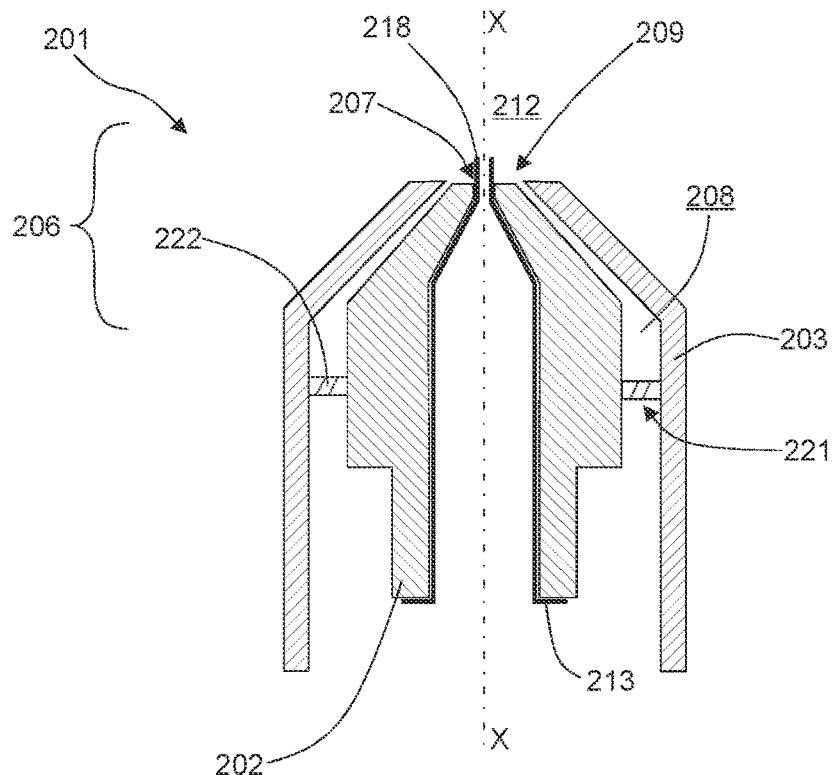

A section through a second embodiment of a preferred nozzle 201 with an optional attachment part 220 in the annular gap 208 in the form of a swirl plate for the guidance of the gas is represented in FIG. 5.

The preferred nozzle 201 according to the second embodiment in its basic construction corresponds to the first embodiment of the preferred nozzle 101 which is shown in FIGS. 2 to 4. The difference between the two embodiments is the fact that the preferred nozzle 201 in contrast to the nozzle 101 comprises an optional attachment part 221 which is designed in the form of a swirl plate for leading the gas. In the present second embodiment of the preferred nozzle 201, the attachment part 221 comprises openings 222 which are at an angle to the gas, in particular atomisation gas, which flows parallel to the outer pipe 203. By way of this, the gas which flows in the annular gap 208 undergoes a swirling about the axis X-X. The onflow and the movement behaviour and thus also the vibration frequency of the inlay 213 which projects at least partly out of the exit opening 207 of the inner pipe 202 can be influenced by the swirling about the axis X-X.

The attachment part 221 can likewise be designed in the form of swirl bodies, e.g., flow guide plates or the like, for leading the gas. The attachment part 222 is preferably fixedly connected to the inner pipe 202 and to the outer pipe 203. By way of this, the stability of the nozzle 201 in the region of the nozzle mouthpiece 206 is increased. Furthermore, due to the installation of an attachment part 221 in the form of swirl bodies, swirl plates or the like, the leading of the flow of the gas, in particular of the atomisation air, at the nozzle mouthpiece 206, in particular in the exit region 212 of the nozzle 201 is influenced, by which means the movement behaviour of the inlay 213 which projects at least partly out of the inner pipe 202, in particular the vibration frequency of the part-section of the inlay 213, can be changed. The vibration frequency is therefore adjustable to the manufacturing and/or spraying process to an improved extent. Additionally, by way of this, the spray symmetry, and the droplet size of the spray, i.e., of the substance to be atomised, preferably of a liquid, very particularly preferably of a dispersion, emulsion or suspension can be adjusted in a direct manner. Furthermore, on installing, the inner pipe 202 is led in outer pipe 203 and always held in the desired position, in FIG. 5 in a concentric position about the axis X-X. Furthermore, the attachment part 221 prevents an oscillation of the inner pipe 102, which leads to a change of the exit openings 207 of the inner pipe 202 as well as of the exit openings 207 of the outer pipe 203, which changes the flow conditions at the nozzle mouthpiece 206, in particular in the exit region 212 of the nozzle 201 and thus also influences the spray geometry and the droplet size of the spray.

Preferably, the inlay 213 which projects at least partly out of the exit opening 207 of the inner pipe 202 has a variable wall thickness. The wall thickness of the inlay 213, in particular of the part-section 218 which projects out of the inner pipe 202 can be adapted to the substance to be sprayed, preferably a liquid, particularly preferably a dispersion, emulsion or suspension, by which means the spray behaviour, preferably the spray symmetry and the setting of the droplet size, of the preferred nozzle 201 can be optimised. The inlay 213 can hence also be adapted to abrasive substances which are to be sprayed. By way of the change of the wall thickness given an equal length of the inlay 213 which projects at least partly out of the inner pipe 202 or by way of adapting the length of the inlay 213 given an equal wall thickness of the inlay 213, the oscillation behaviour of the part-section 218 which projects at least partly out of the exit opening 207 is changed, by which means the applied inlay 213 is specially adapted to the respective process with regard to method technology. The inlay 213 is advantageously connected to the inner pipe 202, so that this is fixed there.

Figure 6:
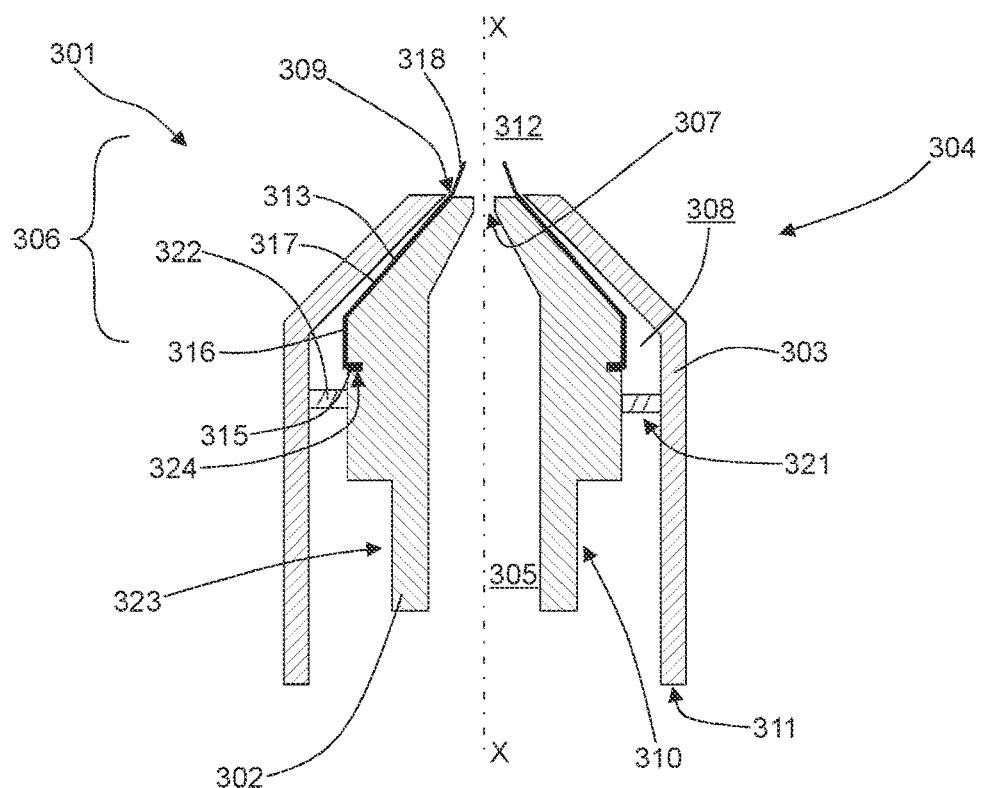

FIG. 6 shows a section through a further, third embodiment of a preferred nozzle 301 with an optional attachment part 321 in the annular gap 308 in the form of a swirl plate for leading gas.

The preferred nozzle 301 comprises a nozzle body 304 which has an inner pipe 302 and an outer pipe 303, wherein the inner pipe 302 and the outer pipe 303 are arranged coaxially to an axis X-X.

The inner pipe 302 comprises a fluid channel 305 which is designed for feeding the substance to be sprayed. This channel opens out into an exit opening 307 of the inner pipe 302 in the region of the nozzle mouthpiece 306. In the region which is away from the exit opening 307 of the inner pipe 302, the inner pipe 302 comprises a coupling location 310 which for a feed conduit for the substance to be sprayed, preferably a liquid, very particularly preferably a dispersion, emulsion, or suspension, said feed conduit not being shown.

The outer pipe 303 is arranged in a manner distanced to the inner pipe 302, by which means an annular gap 308 for feeding the gas, in particular atomisation air, forms. The annular gap 308 runs out into an exit opening 309 of the outer pipe 303 in the region of the nozzle mouthpiece 306. In the region which is away from the exit opening 309 of the outer pipe 303, the outer pipe 303 comprises a coupling location 311 for a feed conduit for the gas, said feed conduit not being shown.

An attachment part 321 which comprises an opening 322 is arranged between the inner pipe 302 and the outer pipe 303. The attachment part 321 connects the inner pipe 302 and outer pipe 303 to one another, preferably in a fixed manner. By way of the attachment part 321, a swirl is imparted upon the gas, in particular the atomisation air, which flows through the annular gap 308. The frequency of the inlay 313 which projects at least partly out of the exit opening 309 of the out pipe 303 is influenced by way of the swirling. The inlay 313 is arranged on the outer wall 323 in the annular gap 308 and bears on the outer wall 33.

The inlay 313 which projects at least partly out of the exit opening 309 of the outer pipe 303 into the exit region 312 comprises four part-sections 315, 316, 317 and 318. Part-section 315 is fixed, for example clamped in a groove 324 which is arranged on the outer wall 323. The part-sections 316 and 317 connect the part-sections 315 and 318. The length of the inlay 313 is changeable, in particular the length of the part section 318 of the inlay 313 is adaptable to the parameters of the manufacturing and/or spraying process. Furthermore, the wall thickness of the inlay 313 which projects at least partly out of the exit opening 309 of the outer pipe 303 into the exit region 312, in particular the wall thickness of the part section 318 of the inlay 313 is adaptable to the process parameters with regard to method technology. In FIG. 6, the wall thickness of the inlay 313 decreases from the part section 315 to the part section 318.

The inlay 313 which projects at least partly out of the exit opening 309 of the outer pipe 303 into the exit region 312 is moved in particular at a high frequency by way of the substance, in particular a liquid, which is to be sprayed and which exits out of the preferred nozzle 301, and/or by way of the gas, in particular the atomisation gas, which exits out of the preferred nozzle 301. By way of the in particular high-frequency movement or oscillation of the inlay 313 which projects at least partly out of the exit opening 309 of the outer pipe 303 into the exit region 312, vibrations at a certain frequency arise at the inlay 313, by which means caking or adhesion of the substance to be sprayed, preferably a liquid, very particularly preferably a dispersion, emulsion, or suspension, which leads to deposits on the nozzle mouthpiece 306, is prevented. Due to the prevention of deposits on the nozzle mouthpiece 306 in the exit region 312 and/or due to the prevention of agglomeration of the substance to be sprayed, the symmetry and droplet size of the spray are not influenced during the manufacturing and/or spraying process, so that an undesirable spray-drying and/or a local over-humidification and agglomeration does not occur.

FIGS. 7 to 10 show further four embodiments of the preferred nozzle 401, 501, 601, 701 as a sectioned representation, whose construction shape does not generally differ from the first embodiment of the nozzle 101. In particular, the embodiments differ from the first embodiment of the preferred nozzle 101 in that the inlay 413, 513, 613 and 713 is arranged at a different position on the inner pipe 402, 502, 602, 702 or outer pipe 403, 503, 603, 703. Hereinafter, the four embodiments of the preferred nozzle 401, 501, 601, 701 are described in more detail.

Figure 7:
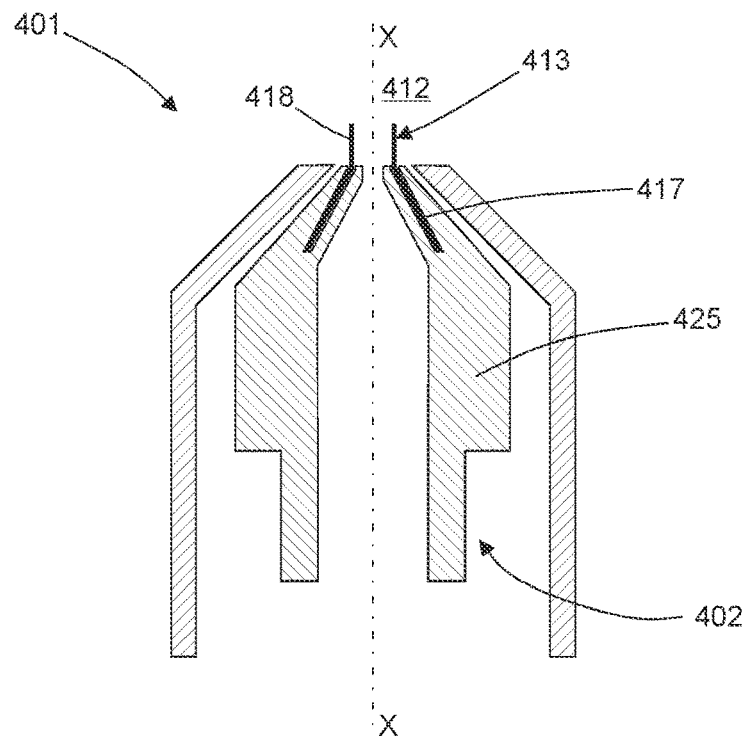

Hereby, a section through a fourth embodiment of a preferred nozzle 401 is shown in FIG. 7. The inlay 413 in the fourth embodiment of the preferred nozzle 401 is arranged in a wall 425 of the inner pipe 402 and its part-section 418 projects into the exit region 412 of the nozzle 401. The inlay 413 according to the fourth embodiment comprises two part-sections 417 and 418, wherein the part-section 417 serves for fastening the inlay 413 in the wall 424 of the inner pipe 402. Advantageously, the inlay 413 is clamped in the wall 425 of the inner pipe 402 or the like, so that this is fixed there.

Figure 8:
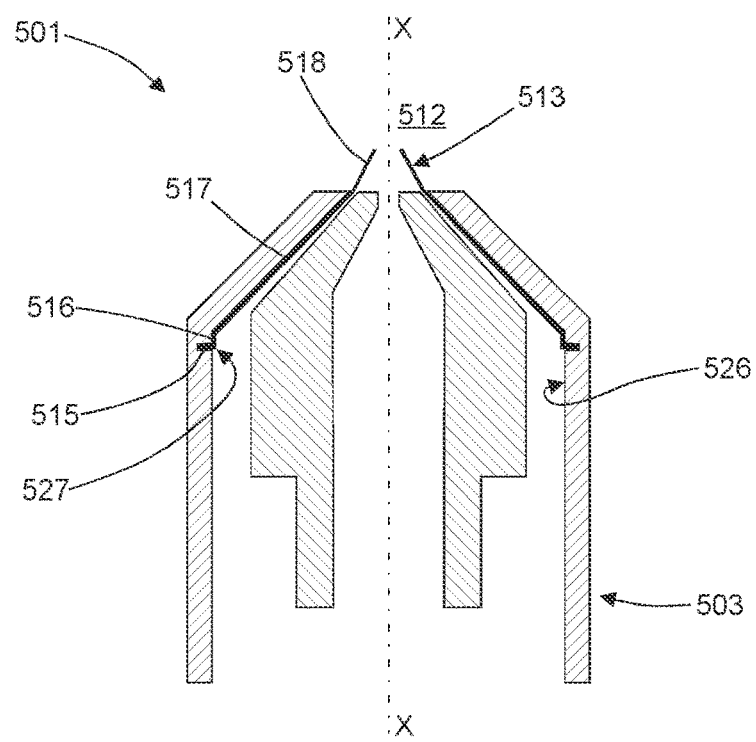

A section through the fifth embodiment of a preferred nozzle 510 is shown in FIG. 8. According to FIG. 8, the inlay 513 in the fifth embodiment of the nozzle 501 is arranged on an inner wall 526 of the outer pipe 503. The inlay 513 hereby comprises four part-sections 515, 516, 517 and 518, wherein the part-section 518 projects out of an exit opening 509 of an outer pipe 503 at least partly into an exit region 512. The inlay 513 is arranged in a groove 527 in the inner wall 526 of the outer pipe 503 by way of the part-section 515 and is fixed there, for example by way of pressing.

Figure 9:
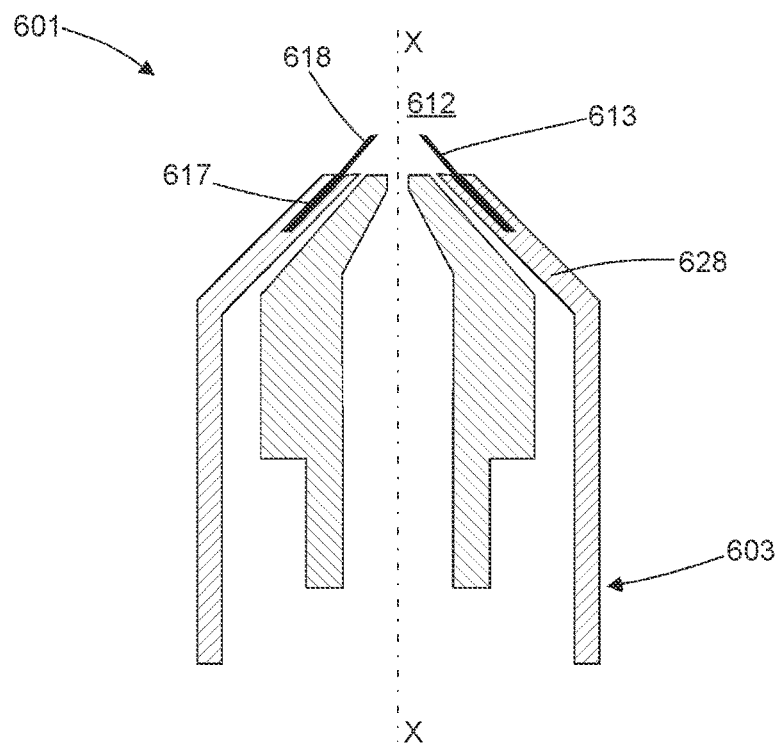

A section through a sixth embodiment of a preferred nozzle 601 is represented in FIG. 9, wherein the inlay 613 in the sixth embodiment of the nozzle 610 is arranged in a wall 628 of the outer pipe 603. The inlay 613 is hereby arranged in a wall 628 of the outer pipe 603 and its part-section 618 projects into the exit region 612 of the nozzle 601. The inlay 613 according to the sixth embodiment comprises two part-sections 617 and 618, wherein the part-section 617 serves for fastening the inlay 613 in the wall 628 of the outer pipe 603. Advantageously, the inlay 613 is clamped or the like in the wall 628 of the outer pipe 603, so that this is fixed there.

Figure 10:
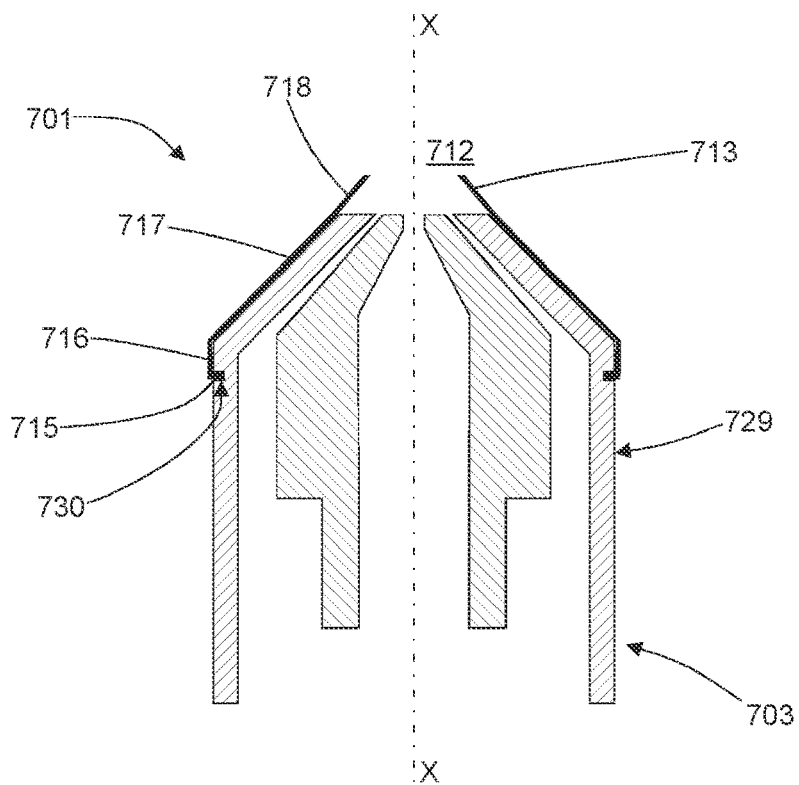

FIG. 10 shows a seventh embodiment of the preferred nozzle 701, wherein the inlay 713 is arranged on an outer wall 729 of the outer pipe 703. According to FIG. 10, the inlay 713 in the seventh embodiment of the nozzle 701 is arranged on an outer wall 729 of the outer pipe 703. The inlay 713 hereby comprises four part-sections 715, 716, 717, and 718, wherein the part-section 718 at least partly projects into an exit region 712. The inlay 713 is arranged in a groove 730 in the outer wall 729 of the outer pipe 703 by way of the part-section 715 and is fixed there, for example clamped or pressed.

All embodiments 101 to 701 can comprise an optional attachment part 101 to 701 for leading the flow in the annular gap 108 to 708. Furthermore, there is the possibility of the arrangement of an inlay 113 to 713 on the inner pipe 102 to 702 and of an additional inlay 113 to 713 on the outer pipe 103 to 703, so that the preferred nozzles 101 to 701 comprise two inlay 113 to 713.

Figure 11:
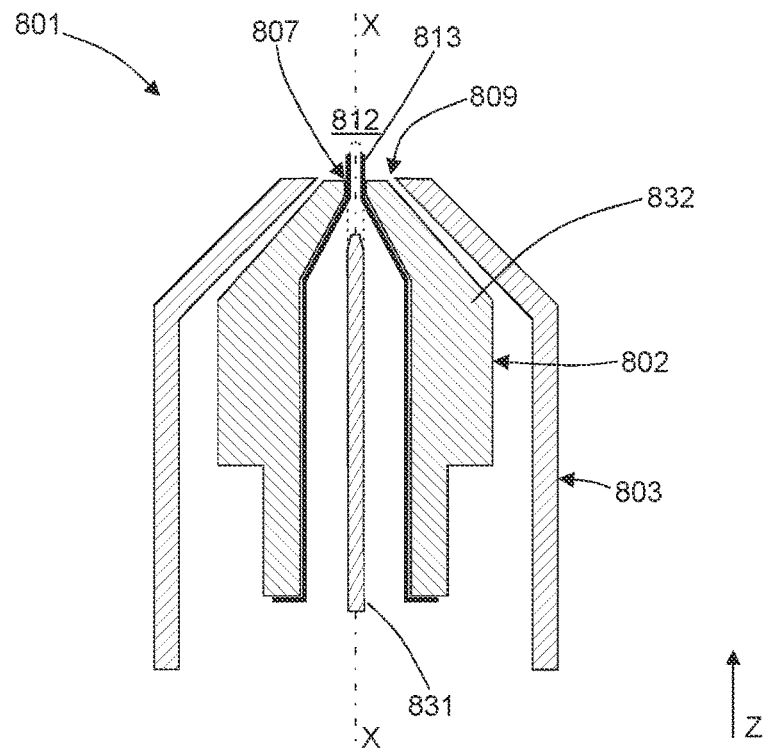
Figure 12:
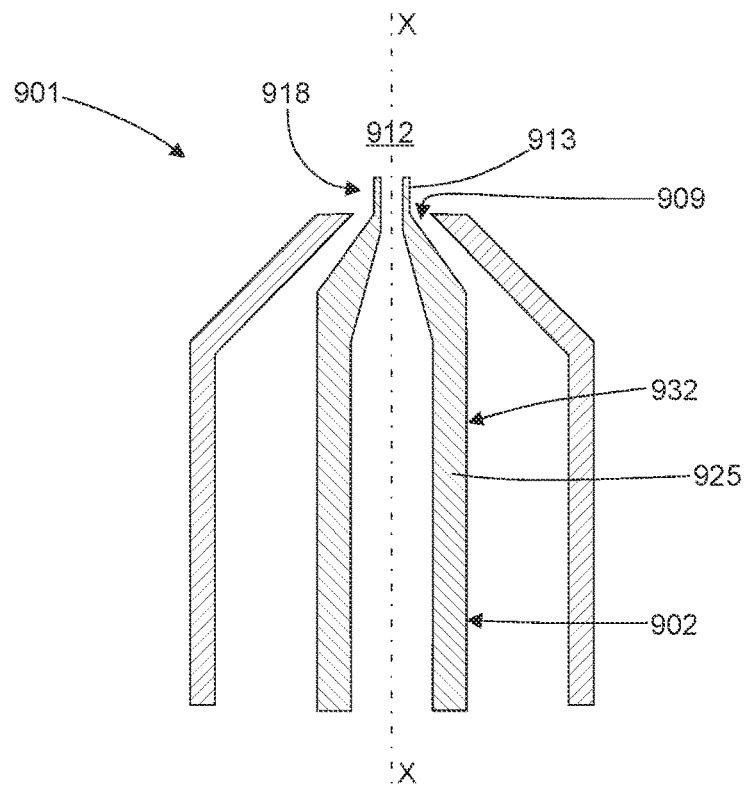

FIG. 11 represents a section through a preferred nozzle 801 according to the first embodiment, wherein the nozzle 801 according to FIG. 11 comprises a nozzle needle 813 which is displaceable in the axial direction of the axis X-X for the closure of the exit opening 807 of the inner pipe 802 of the nozzle 801. By way of the axial displacing of the nozzle needle 831 in the Z-direction along the axis X-X out of the home position according to FIG. 11 into an end position which is represented dashed, the exit opening 807 of the inner pipe 802 of the nozzle 801 which comprises the inlay 813 is closed. By way of this, the exit of a substance to be sprayed from the preferred nozzle 801 is prevented. Furthermore, there exists the possibility of also displacing the inner pipe 802 in the Z-direction, additionally to the nozzle needle 831, so that the exit opening 807 of the inner pipe 802 of the nozzle 801 as well as the exit opening 809 of the outer pipe 803 of the nozzle 801 is closed.

A widening of the inner pipe 802 by way of the nozzle needle 831 is also possible. By way of this, in the case for example of a filling of a granulator, a coater, in particular of a drum coater, or a fluidisation apparatus, one succeeds in pellets or particles being prevented from penetrating into the exit openings 807, 809 of the nozzle 801 and this therefore becoming blocked already before the beginning of the manufacturing process. Preferably, hereby the inner pipe 802 and the inlay 813 are designed as one piece as a conduit, preferably in the form of an elastic material, preferably a silicone. Furthermore, by way of this one prevents the inlay 813 dislocating with respect to the inner pipe 802 due to the displacement of the nozzle needle 813.

A section through a preferred nozzle 901 is shown in FIG. 12, wherein the inlay 913 and the inner pipe 902 of the preferred nozzle 901 are designed as one piece as a conduit 932. The inlay 913 and the inner pipe 902 however can just as easily be designed as two separate components. According to this embodiment, the inlay 913 and the inner pipe 902 form the inner conduit 932. This is preferably manufactured of an elastic material, preferably of a polymer, in particular of a silicone. Advantageously, by way of this, it is even simpler to be able to exchange the inner conduit 932 of the preferred nozzle 901 which comprises the substance to be sprayed. Furthermore, there is the possibility of designing the inner conduit as a disposable article, which for example in the pharmaceutics industry in the case of a change of the substance to be sprayed, on account of a change of product leads to considerable advantages and a significant simplification of the working process in comparison to a cleaning of the inner pipe 902.

According to FIG. 12, in particular the part-sections 918 which project out of the exit openings 909 of the outer pipe 903 into the exit region 912 are designed with a very low thickness. The wall 925 of the inner pipe 902 is advantageously designed with a larger wall thickness than the part-section 918 for reasons of stability of the inner pipe 918. Very particularly preferably, the heavily loaded wall sections are likewise designed in a reinforced manner, for example by way of a polymer or the like which is fibre-reinforced at this location.

Figure 13:
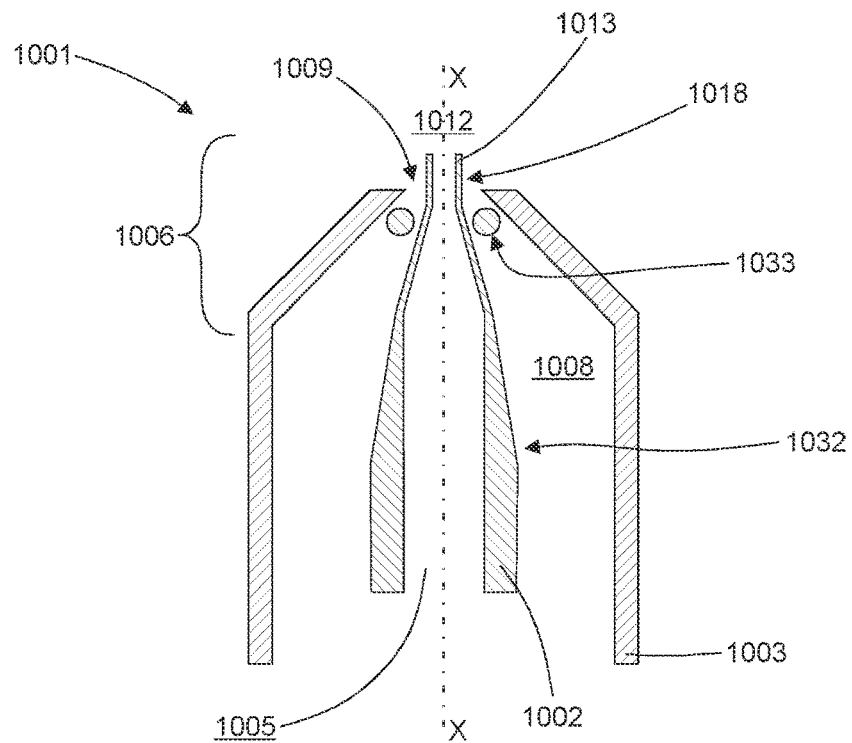
Figure 14:
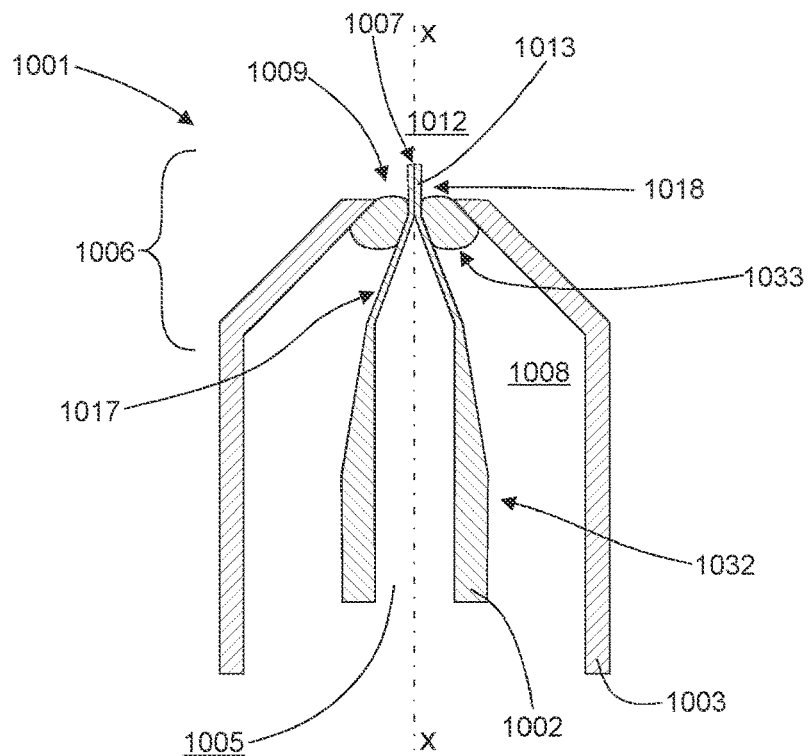

FIGS. 13 and 14 show a further preferred embodiment of a nozzle 1001 with a device 1033 which can be changed in its volume.

FIG. 13 shows a section through a preferred nozzle 1001, wherein the inlay 1013 and the inner pipe 1002 form a conduit 1032, preferably of a single piece, of the nozzle 1001. The conduit 1032 is designed at least partly from an elastic material, in particular from a polymer and very preferably from a silicone, and a device 1033 which can be changed in its volume, in particular an inflatable pressurised air ring or the like is arranged in the region of the nozzle mouthpiece 1006 in the annular gap 1008 between the inner pipe 1002 and the outer pipe 1003.

The device 1033, in particular the pressurised air ring, which is changeable in its volume comprises at least one inlet for a fluid feed and at least one outlet for a fluid discharge, said inlet and outlet not being represented here. By way of this, the volume of the device 1033 can be changed, specifically can be enlarged, or reduced in size by way of the feed or discharge of fluid, by which means the device 1033 can be brought or is brought from an open position which is shown by way of example in FIG. 13 into a closure position which is shown in FIG. 14, or vice versa. The closure position is always given as soon as the inner pipe 1002 is closed by the device 1033, independently of the opening degree of the annular gap 1008, through which the gas, in particular the atomisation air flows. In the open position which is shown in FIG. 13, on the one hand the gas can flow through the annular gap 1008 and on the other hand the substance to be sprayed, in particular a liquid or dispersion can flow through the fluid channel 1005, by which means the gas can atomise the substance to be sprayed at the exit. Advantageously, the device 1033 has no or a negligible influence upon the flow of the gas which flows through the annular gap 1008.

It should always be noted that the substance to be sprayed, in particular the liquid should not exit from the nozzle 1001 in a non-atomised state. For this, it is to be ensured that at the beginning of each spraying procedure, it is firstly gas, in particular atomisation gas which flows through the annular gap 1008 and thus out of the nozzle 1001 and subsequently the substance to be sprayed, in particular the liquid. On completing the spraying procedure, firstly the feed of the substance to be sprayed is to be stropped or interrupted and subsequently that of the gas. By way of this, it is ensured at all times than given a spraying procedure, the substance to be sprayed is atomised and that no substance to be sprayed drips out of the nozzle, possibly onto (coated) material to be treated, in a non-atomised state at the end of each spraying procedure. On starting or ending a spraying procedure, this can be ensured for example by way of an automatic "leading" and "trailing" of the gas.

All positions, in which fluid can flow through the annular gap 1008 and/or the fluid channel 1005 are denoted as an open position. By way of this, it is possible to provide an infinite adjustment of the volume flow with a through-flow of 0% and 100% for the gas and for the substance to be sprayed, wherein the adjustment of the volume flows is dependent on one another given only one device 1033. With the application of several, in particular two devices 1033, specifically each for the substance which is to be spayed which is conveyed in the fluid channel 1005 and the gas which is conveyed in the annular gap 1008, the volume flows of the substance to be sprayed in the fluid channel 1005 of the inner pipe 1002 and of the gas in the annular gap 1008 can be adjustable independently of one another and can be adjusted independently of one another, specifically by way of volumes of the applied devices 1033 which can be changed independently of one another by way of fluid feed or fluid discharge. By way of the independent adjustability of the volumes of different devices 1033, an optimal adaption of the volume flow of the substance to be sprayed to the atomisation gas and vice versa is likewise possible. By way of this, one can also react to the smallest changes of symmetry or particle size in the spray. The devices 1033 for the substance to be sprayed and for the gas are closed-loop controlled and/or controlled independently of one another by way of control devices and/or closed-loop control devices which are not shown here. The device 1033 is preferably arranged concentrically around the conduit 1032 and is enclosed by the outer pipe 1003, wherein a part-section 1018 projects at least partly out of the exit opening 1009 of the outer pipe 1003 into the exit region 1012. In FIG. 13, the device 1033 is designed annularly about the inner pipe 1002. The device 1033 is preferably designed as a pressurised air ring. The device 1033 however can also be designed in any conceivable other embodiment.

The device 1033 is preferably connected to a closed-loop control or control device which is not shown here and which closed-loop controls or controls the fluid feed or fluid discharge to and from the device 1033, so that the volume of the device 1033 can be set or is set. Very particularly preferably, the volume of the device 1033 is infinitely changed or infinitely changeable by way of the fluid feed or the fluid discharge or the volumes of the devices 1033 are infinitely changeable or changed by way of the fluid feed or fluid discharge. By way of the infinite adjustability of the volume of the device 1033 or of the devices 1033, it is possible to adjust the volume flows of the substance to be sprayed and of the gas which atomises the substance to be sprayed, to one another in a precise and targeted manner, so that the symmetry and the droplet size of the spray is set or can be set in an optimal manner for the process, in particular for the coating process of particles, preferably tablets. In FIG. 13, the volume of the device 1033 is minimal, so that the nozzle 1001 is situated in the maximal open position. The maximal open position is accordingly characterised in that the device 1033 has a minimal volume.

A section through the preferred nozzle 1001 is shown in FIG. 13, wherein the inlay 1013 and the inner pipe 1002 form a conduit 1032 of the preferred nozzle 1001 and the preferred nozzle 1001 in the region of the nozzle mouthpiece 1006 between the inner pipe 1002 and the outer pipe 1003 comprises a device 1033 which changeable in its volume, wherein the device in FIG. 14 represents a closure position of the preferred nozzle by way of the device 1033 closing the fluid channel 1005 and the annular gap 1008. The inlay 1013 is brought into oscillation, in particular a high-frequency oscillation by way of the substance which is to be sprayed which exits through the exit opening 1007 of the inner pipe 1002 and/or by way of the gas which exits through the exit opening 1009 of the outer pipe 1003, in order to minimise or completely prevent deposits in the exit region 1007, 1009 of the substance to be sprayed and/or of the gas. Preferably, a part-section 1018 of the inlay 1013, in particular during the spraying procedure, can also be changed in length. On account of the additional length changeability of the part-section 1018 of the inlay 1013 which projects at least partly out of the inner pipe 1002 or the outer pipe 1003 of the nozzle 1001, it is possible to change the movability of the part-section 1018, in particular the frequency of the vibration of the part-section 1018 of the inlay 1013. By way of the aforementioned measures, the symmetry and the droplet size of the spray is not influenced by deposits of the substance to be sprayed, during the manufacturing and/or spraying process, so that an undesirable spray drying and/or a local over-humidification and agglomeration does not occur.

The preferred nozzle 1001 with a volume of the device 1003 which is enlarged in comparison to the open position according to FIG. 13 is represented in FIG. 14. For this, the pressurised air ring which is preferably used as a device 1033 is inflated with a fluid, in particular with a gas, preferably pressurised air or the like. The device 1033 is connected to a supply container which is not shown via a conduit which is likewise not shown and via which the device 1033 can be filled or emptied for example by way of a control device and/or closed-loop control device, which is not represented, so that the device 1033 changes its volume from a first volume in the open position according to FIG. 13 to a second volume in the closure position according to FIG. 14 and vice versa.

In the present embodiment example, the conduit 1032, in particular the part-sections 1017 and 1018 which are arranged in the nozzle mouthpiece 1006, as well as the annular gap 1008 are sealed off by way of the enlarged volume of the device 1033. The conduit 1032, here the part-sections 1018 are pressed together and the exit opening 1009 additionally closed due to the enlarged volume, so that a fluid can flow neither through the fluid channel 1005 nor through the annular gap 1008. By way of this, for example in the case of the filling of a granulator, a coater, in particular a drum coater, or a fluidisation apparatus, one succeeds in no pellets or particles being able to penetrate into the exits openings 1007, 1009 of the nozzle 1001 and therefore blocking these already before the beginning of the manufacturing process.

Further developments of the preferred nozzle 1001 which comprises a device 1033 which is changeable in its volume are conceivable. For example, there is the possibility of the nozzle 1001 comprising several devices 1033, in particular two devices 1003. Preferably, these are separated from one another by devices such as plates or the like, so that these can be operated independently of one another. Advantageously, the nozzle 1001 comprises a first device 1033 for the closure of the annular gap 1008 and a second device 1033 for the closure of the fluid channel 1005. Hereby, the two devices 1033 are preferably to be separated by way of a plate or the like which functions as a separating wall, so that the volume change of a first device 1033 closes or opens the fluid channel 1005 and the volume change of a second device 1033 closes or opens the annular gap 1008, without a volume change of the one device 1033 influencing the other device 1033. By way of this, it is possible to provide an infinite adjustment of the volume flow with a through-flow of 0% and 100% for the atomisation gas as well as for the substance to be sprayed, wherein the adjustment of the volume flows can be effected independently of one another or in a manner depending on one another. On using at least two devices 1033, it is to be noted that the substance to be sprayed, in particular the liquid cannot exit out of the nozzle 1001 in a non-atomised manner, since otherwise a product rejection can occur, for example by way of agglomerated tablets. For this, it is to be ensured that at the beginning of each spraying procedure, it is firstly the gas, in particular the atomisation gas which flows through the annular gap 1008 and thus out of the nozzle 1001 and subsequently the substance to be sprayed, in particular the liquid. On completing the spraying procedure, the feed of the substance to be sprayed is firstly to be stopped and subsequently that of the gas. A closed-loop control or control device can accomplish this. By way of this, it is ensured at all times that the substance to be sprayed is always atomised given a spraying procedure and that no substance to be spayed drips out of the nozzle possibly onto material to be treated (coated), at the end of each spraying procedure.

It is always to be ensured than on bringing the device 1033 from the one closure position of the inner pipe 1002 into the at least one open position of the inner pipe 1002, the gas which flows through the annular gap 1008 begins to flow through the annular gap at least simultaneously with the bringing of the device 1003 from the one closure position of the inner pipe 1002 into the at least one open position of to inner pipe 1002. It is further advantageous that on bringing the device 1033 from the at least one open position of the inner pipe 1002 into the one closure position of the inner pipe 1002, the gas which flows through the annular gap 1008 stops flowing through the annular gap 1008 at the earliest simultaneously on bringing the device 1033 from the at least one open position of the inner pipe 1002 into the one closure position of the inner pipe 1002.

Figure 15:
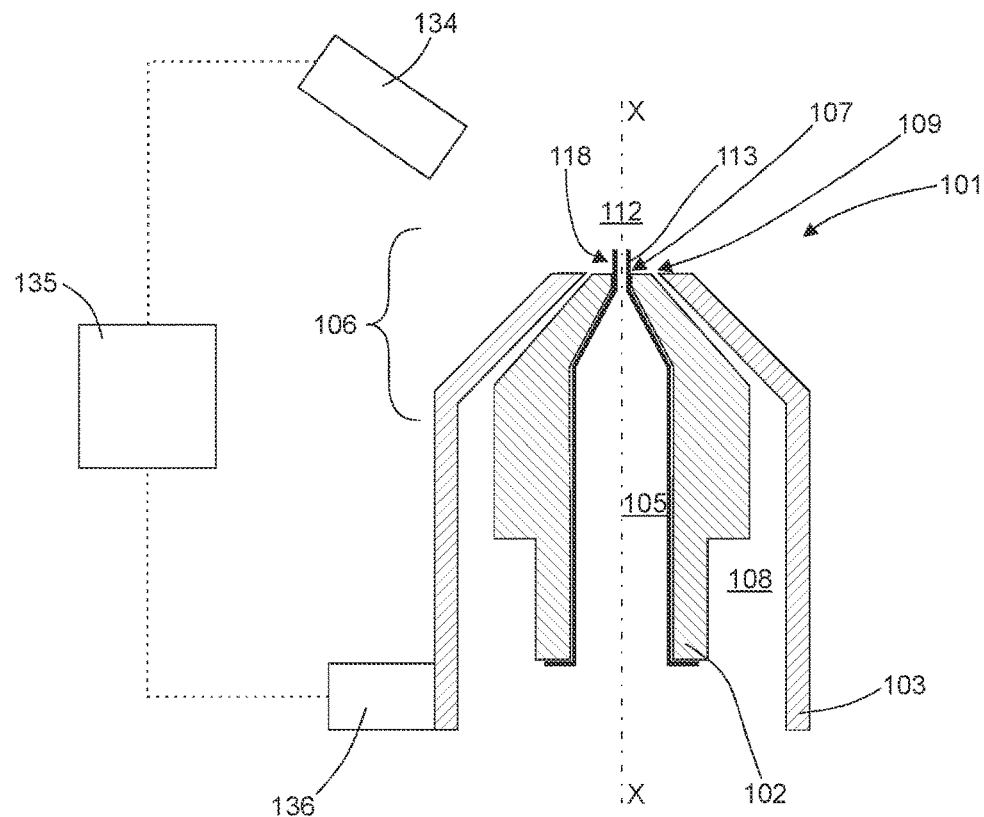
Figure 16:
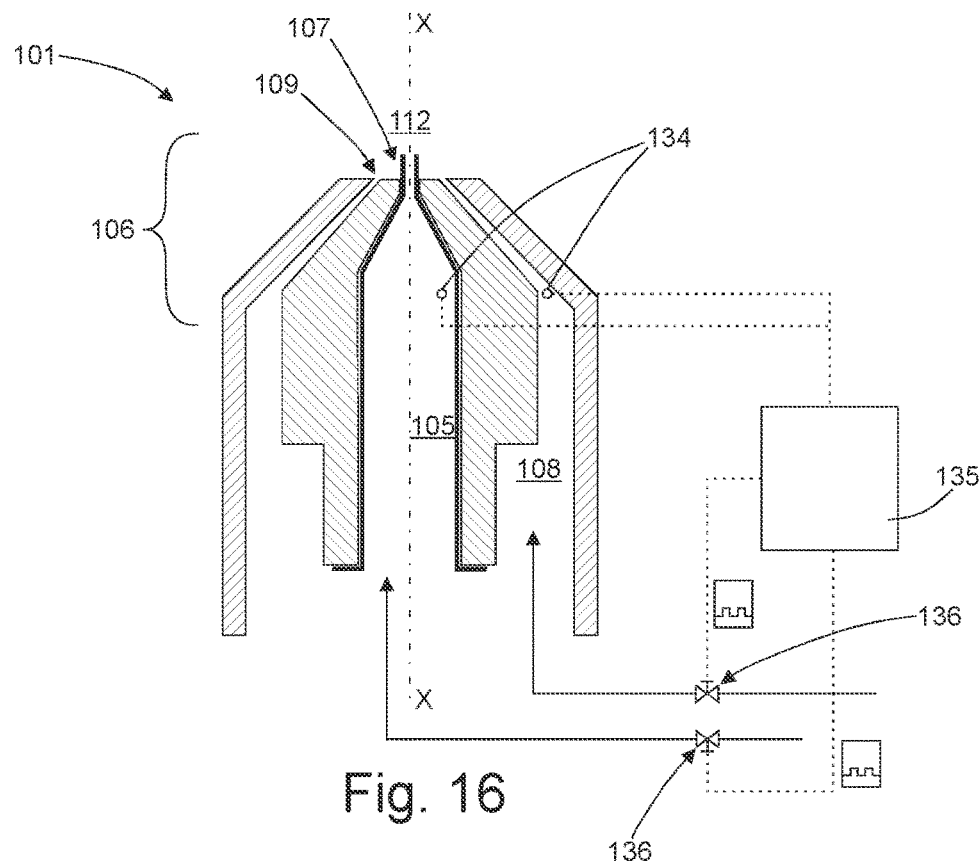

Advantageously, on starting up or ending the spraying procedure, by way of this method it is ensured that no exit of the substance to be sprayed occurs at the nozzle mouth, which is to say at the exit openings 1007, 1009 of the inner pipe 1002 and the outer pipe 1003, without this substance being atomised directly by the gas which flows through the annular gap 1008. An atomisation of the substance to be sprayed is therefore always ensured by the method. By way of this, on the one hand deposits on the nozzle mouth for example given the drying of the substance to be sprayed which has exited too early and on the other hand an agglomeration of particles to be sprayed on account of the non-atomised substance to be sprayed do not occur. FIG. 15 represents a schematic construction of a first method for monitoring the nozzle mouthpiece 106 of a first embodiment of the preferred nozzle 101. The nozzle 101 corresponds to that of the description of FIGS. 2 to 4. All other preferred embodiments of the nozzle 101, 301, 401, 501, 601, 701, 801, 901 and 1001 as well as further nozzles according to the invention can be monitored by this method. The nozzle 101 comprises an inner pipe 102 and an outer pipe 103 as well as an inlay 113 which is arranged on the inner pipe 118, wherein the part-section 118 projects at least partly out of the exit opening 107 of the preferred nozzle 101 into an exit region 112.

The monitoring of the nozzle mouthpiece with regard to deposits by way of the sensor 134 in the embodiment example of FIG. 15 is effected by way of a sensor 134 which is arranged outside the nozzle. Furthermore, the construction for the first method comprises a sensor 134, in particular an optical sensor, very particularly preferably an imaging sensor, for example a camera or an ultrasound sensor, or a sensor which detects a physical measuring variable, for example a pressure sensor, very particularly preferably a differential pressure sensor. The sensor 134 detects the nozzle 101, in particular the nozzle mouthpiece 106, very particularly preferably the exit openings 107, 109 of the inner pipe 102 and/or of the outer pipe 103 in the exit region 112 of the nozzle 101. The sensor 134 is sampled at a defined, adjustable rate. The sensor 134 is connected to a control unit 135, in particular to a data-processing computer, for example an industrial PC or to be embedded PC or the like. The data which is detected by the sensor 134 is transmitted to the control unit 135. The control unit 135 evaluates the data of the sensor 134. The control unit 135 therefore determines, for example by way of an algorithm or the like, whether deposits form or have formed on the nozzle 101, in particular the nozzle mouthpiece 106, very particularly preferably the exit openings 107, 109 in the exit region 112 of the nozzle 101. Such deposits compromise the quality of the spray, in particular the symmetry and/or the droplet size during the manufacturing and/or spraying process.

As soon as a certain stored limit values has been exceeded, for example due to deposits, by which means the symmetry and droplet size of the spray is compromised during the manufacturing and/or spraying process, the control unit 135 transmits a signal to be device 136. In the embodiment example of FIG. 15, the device 136 is designed as a vibration device and is connected to the nozzle 101. The device 136 brings the nozzle 101 into vibration in a manner such that the deposits on the nozzle 101 detach. As soon as the deposits are no longer present on the nozzle 101, in particular on the nozzle mouthpiece 106, very particularly preferably at the exit openings 107, 109 in the exit region 112 of the nozzle 101, the respective signal is detected by the sensor 133 and transmitted to the control unit 135 which subsequently transfers a signal to the device 136, said signal switching off the device 136. This procedure is repeated over the complete manufacturing and/or spraying process as often as is necessary.

The continuous monitoring of the preferred nozzle 101 which is carried out by the sensor 134 is preferably effected as an inline, atline or online measurement. For example, an ultrasound sensor detects the actual shape and the current dimensions of the preferred nozzle 101 (actual values). This data is subsequently used in the control unit 135 for assessing the spray quality and is compared to the initial data (setpoint) of the preferred nozzle 101. Preferably, given too large a difference between the actual value and the setpoint, a signal is transmitted from the control unit 135 to the device 136 and the necessary measures (vibration) are started. Hereby, the device 136 which is designed as a vibration unit is connected to the nozzle 101 and on receiving a signal from the control unit 135 brings the nozzle into a vibration, so that the deposits at the nozzle mouthpiece 106 detach. The incorporation of the aforementioned steps into the manufacturing and/or spraying process permits the automatic monitoring of the spray quality over the entire duration of the manufacturing and/or spray process.

The monitoring of the nozzle mouthpiece 106 by the sensor 134 with regard to deposits is effected by a sensor 134 which is arranged within the nozzle 101 in the embodiment example of FIG. 16. Such an arrangement is sometimes useful, in particular in the case of constructionally restrictive conditions, for example given drum coaters or the like which have a small volume.

A second schematic construction of a method for monitoring the nozzle 101, in particular the nozzle mouthpiece 106, very particularly preferably the exit openings 107, 109 in the exit region 112 of a first embodiment of the preferred nozzle 101 is shown in FIG. 16. The pressure conditions of the original nozzle shape in the exit region 112, i.e., without deposits or caking, correspond to the setpoint on pressure measurement. Hereby, a pressure sensor 134 is arranged in each case in the fluid channel 105 and in the annular gap 108. The method preferably comprises several sensors 134, in particular sensors 134 which operate independently of one another. By way of the several sensors 134, it is possible to detect deposits on the nozzle mouthpiece 106 of the nozzle 134 which negatively influence the symmetry and the droplet size, to an improved extent, so that the most suitable measure for detaching the deposits, for example vibration or pulse, can be initiated.

The two sensors 134 are sampled at a certain adjustable rate, or at a certain cycle. Should deposits or agglomerations occur at the nozzle 101, in particular at the nozzle mouthpiece 106, very particularly preferably at the exit openings 107, 109 in the exit region 112, then the pressure in the fluid channel 105 and/or the annular gap 108 increases (actual value).

This pressure increase is detected by the sensor 134 and is transferred to a control unit 135. For example, the mass flow and thus also the volume flow of the substance to be sprayed and/or of the atomisation gas can be computed by way of the detected physical measured variable, here for example the absolute pressure. The pressure which is detected with measurement technology at the sensors 134 provides information of the deposits on the nozzle mouth piece 106. Deposits b on the nozzle mouthpiece 106 lead to a pressure increase in front of the exit openings 107, 109 in the fluid channel 105 or annular gap 108 and thus to a larger flow speed of the substance to be sprayed and/or of the gas, so that given a suitable specification of thresholds values (setpoint) or tolerance ranges (for example ±10% deviation) and their exceeding or falling-short, the control unit 135 can initiate suitable counter measures for removing the deposits by way of transmitting a signal to the device 136.

On monitoring, a continuous comparison between the actual value and the setpoint takes place by the control unit 135.

As soon the exceeding or falling-short of a certain limit value (setpoint) is registered by the control unit 135, the control unit 135 transmits a corresponding signal to a device 136. In the embodiment example of FIG. 16, the device 136 is designed as a pulsation device. This is realised for example by closed-loop control valves on the corresponding feed conduits of the fluids. The device 136 generates a pulsating flow of the substance which is to be sprayed and/or of the gas, in particular the atomisation gas, represented by the two diagrams in FIG. 16. Preferably, the gas flow is pulsed only for a short while. If the pressure subsequently exceeds or falls short of the limit value again, then the manufacturing and spraying process is continued. If the limit value continues to be exceeded or fallen short of, then a renewed pulse is produced. The imparted pulse can have different frequencies, in particular between 1 Hz and 1500 Hz, preferably between 25 Hz and 250 Hz. By way of this, the deposits on the mouthpiece 106 in the region of the exit openings 107, 109 of the inner and outer pipe 102, 103 can be detached and removed to an improved extent. This procedure is repeated unit the deposits or agglomerations at the nozzle 101 are removed, so that the desired spray quality is always ensured.

The monitoring of the droplet size of the spray during the manufacturing and/or spraying process, for example by way of a laser measuring method, forms a third method. Given deviations of the actual value from the setpoint of the droplet size, i.e., given a non-optimal droplet size, the measures which are to be made generally correspond to the measures of the first and second method according to FIG. 15 or FIG. 16.

The invention claimed is:

1. A nozzle for spraying substances, comprising:

a nozzle body which has a nozzle mouthpiece, wherein the nozzle body comprises an inner pipe, said inner pipe being connected to a feed for a substance to be sprayed and comprising an inner wall, a fluid channel, an exit opening, and an outer pipe, said outer pipe being distanced to the inner pipe, being connected to a feed for a gas and comprising an exit opening, wherein the exit opening of the inner pipe and the exit opening of the outer pipe are arranged in a region of the nozzle mouthpiece, wherein the inner pipe is designed at least partly of an elastic material and a device which comprises an inlet for a fluid feed and an outlet for a fluid discharge is arranged in an annular gap between the inner pipe and the outer pipe, wherein the device has a closure position for closing the inner pipe and at least one open position, wherein in the at least one open position the substance to be sprayed can flow through at least the fluid channel, and wherein the device is designed in a manner such that a volume of the device can be changed by the fluid feed or the fluid discharge, wherein, by changing the volume of the device, the device can be brought or is brought from the closure position into the at least one open position or from the at least one open position into the closure position.

2. The nozzle according to claim 1, wherein the device is arranged in the region of the nozzle mouthpiece.

3. The nozzle according to claim 1, wherein the volume of the device can be adjusted or is adjusted in an infinite manner.

4. The nozzle according to claim 1, wherein the fluid channel has a maximal open position.

5. The nozzle according to claim 4, wherein the volume of the device is at its minimum when the fluid channel is in the maximal open position.

6. The nozzle according to claim 1, wherein the device is designed annularly around the inner pipe.

7. The nozzle according to claim 6, wherein the annularly designed device is designed as a pressurised air ring.

8. The nozzle according to claim 1, wherein the device comprises a first device and a second device.

9. The nozzle according to claim 8, wherein the first device is configured for the closure of the annular gap and the second device is configured for the closure of the fluid channel.

10. The nozzle according to claim 1, wherein an inlay is arranged on the inner pipe or on the outer pipe, wherein the inlay is arranged such that it can be brought or is brought into oscillation by way of the substance to be sprayed which exits out of the exit opening of the inner pipe and/or the gas which flows out of the exit opening of the outer pipe, in order to minimise or to prevent deposits in an exit region of the substance to be sprayed or of the gas.

11. The nozzle according to claim 10, wherein the inlay can be arranged or is arranged in an exchangeable manner.

12. The nozzle according to claim 10, wherein a part-section of the inlay comprises a length, and the part-section of the inlay is changeable in the length.

13. The nozzle according to claim 10, wherein the inlay and the inner pipe are designed as a single-piece conduit.

14. The nozzle according to claim 10, wherein the inlay has a variable wall thickness.

15. The nozzle according to claim 10, wherein the oscillation of the inlay has a frequency of between 5 Hz and 1500 Hz.

16. The nozzle according to claim 1, wherein an inlay is arranged on the inner wall or on an outer wall or in a wall of the inner pipe or on an inner wall or on an outer wall or in a wall of the outer pipe and projects at least partly into an exit region of the substance to be sprayed and/or of the gas.

17. The nozzle according to claim 1, wherein the outer pipe and the inner pipe are arranged coaxially about an axis (X-X).

18. The nozzle according to claim 1, wherein the outer pipe and the inner pipe are arranged to one another in a manner such that the exit opening of the outer pipe is arranged concentrically to the exit opening of the inner pipe.

19. The nozzle according to claim 1, wherein an attachment part for leading the gas is arranged in a region of the nozzle mouthpiece between the outer pipe and the inner pipe.

* * * * *